Nov. 27, 1962 F. X. BUSCHE 3,066,216
RESISTANCE WELDING GUN
Filed July 29, 1960 3 Sheets-Sheet 1

INVENTOR.
FRANCIS X. BUSCHE
BY Burton & Parker
ATTORNEYS

Nov. 27, 1962
F. X. BUSCHE
3,066,216
RESISTANCE WELDING GUN
Filed July 29, 1960
3 Sheets-Sheet 2
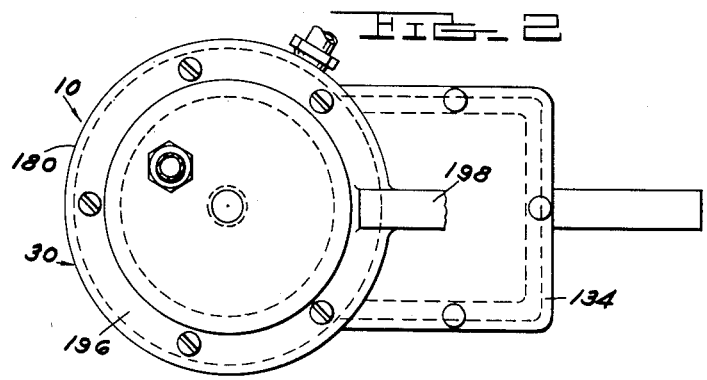
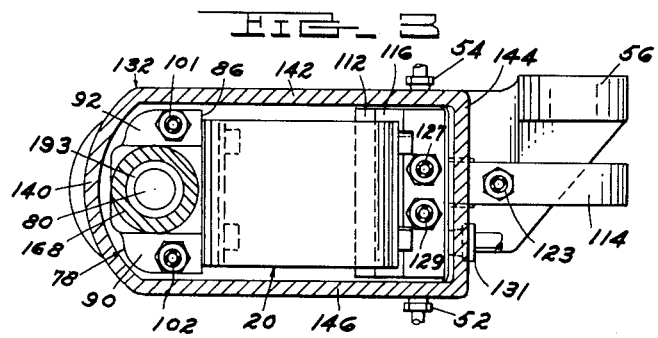
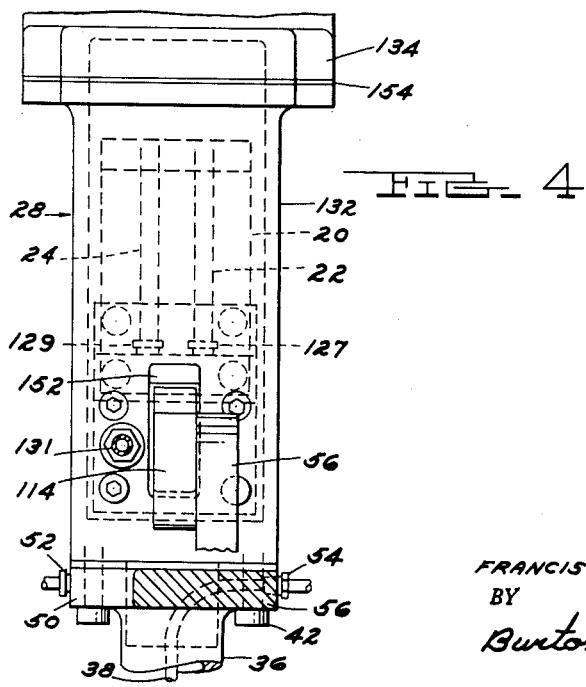
INVENTOR.
FRANCIS X. BUSCHE
BY
Burton & Parker
ATTORNEYS Nov. 27, 1962 F. X. BUSCHE 3,066,216
RESISTANCE WELDING GUN
Filed July 29, 1960 3 Sheets-Sheet 3
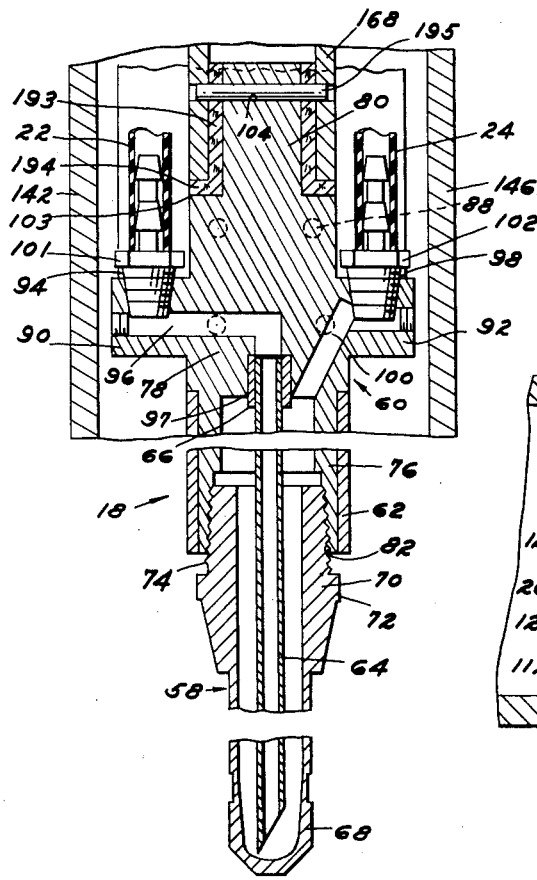
INVENTOR.
FRANCIS X BUSCHE
BY
Burton & Parker
ATTORNEYS

United States Patent Office 3,066,216
Patented Nov. 27, 1962

3,066,216
RESISTANCE WELDING GUN
Francis X. Busche, 25807 Circle Drive, Detroit 41, Mich.
Filed July 29, 1960, Ser. No. 46,244
10 Claims. (Cl. 219—89)

This invention relates to welding equipment. More particularly, it relates to a resistance welding gun.

Resistance welding guns, and particularly those of the portable type, have been extensively employed in so-called spot welding operations. Generally, such guns involve a pair of electrodes presenting electrode tips substantially aligned with one another, oppositely disposed and normally spaced apart. The electrodes are electrically connected to the opposite side of a low-voltage, high amperage source of electricity. Under use conditions, the parts of the article to be welded are interposed in clamped-together condition between the electrode tips and the tips brought together, compressing the parts in between. Since the parts are electrically conductive, such action completes the electrical circuit and a massive quantity of electrical current flows from tip to tip through the parts causing those portions of adjacent surfaces of the parts, which portions are between the tips, to fuse together. One of the electrodes is then pulled away from the article, opening the electrical circuit, and the article removed or shifted in position for another spot weld.

Heretofore, a conventional structure of such guns has involved a pressure fluid cylinder for actuating a relatively movable welding electrode, and a relatively stationary welding electrode.

On one end of the pressure fluid cylinder casing there is mounted a handle assembly for supporting the welding gun and for maneuvering the same into welding position. In this regard, it is conventional practice in portable, resistance welding guns to suspend the same from an overhead point on a counterweight support. Generally, the handle assembly is adapted for mounting on the support.

At the opposite end of the pressure fluid cylinder casing there is a laterally disposed yoke on which is mounted a relatively stationary, welding electrode assembly. The piston rod of the pressure fluid cylinder, coaxial with the longitudinal axis of the gun, extends outwardly from this end of the pressure fluid cylinder casing. Mounted on the piston rod is a relatively movable, welding electrode assembly.

Both welding electrode assemblies comprise tubular electrode members capped at the outer ends thereof with electrode tips. The relatively stationary electrode assembly is so constructed that the electrode tip thereof is presented in opposition to, but in substantial longitudinal alignment with, the tip of the relatively movable, welding electrode assembly. Both electrode assemblies comprise internal structure for conveying a coolant to and from the interior of the electrode tip. Each of the yoke and the relatively movable electrode assembly has a pair of externally protruding coolant fittings or ports for receiving corresponding coolant delivery and discharge hoses. Usually the pairs of fittings or ports are located in the vicinity of each other.

Mounted on the yoke is a stationary cable terminal to which is attached one of the two electric cables from the source of electrical current. This cable terminal is electrically connected to the electrode of the relatively stationary, welding electrode assembly. Another cable terminal is mounted on the gun and is electrically connected to the relatively movable, electrode assembly by means of a so-called rolling shunt. This is a structure comprising a stack of thin, flexible strips or bands of electrically conductive metal secured together at their ends. One end of the rolling shunt is connected to the relatively stationary, corresponding cable terminal. The other end is attached to the relatively movable, electrode assembly. In position the rolling shunt in side view resembles a U with the bight of the U facing in the direction of the relatively stationary, welding electrode assembly. The rolling shunt provides a flexible, low resistance, electrical connection between the corresponding cable terminal and the relatively movable electrode assembly. However, the rolling shunt in the welding guns of heretofore conventional structure has presented a problem. Under conditions of extensive use, a structural failure of the rolling shunt occurs, making it necessary to install a new rolling shunt. As the shunt is cooled by the ambient atmosphere its temperature rises during operation of the gun thereby increasing the shunt resistance.

Another problem presented by the resistance welding guns of heretofore conventional structure is that the coolant conducting hoses to and from the relatively movable, welding electrode assembly, which hoses move with the electrode assembly, tend to interfere with the welding operation and tend to clutter the area in which the welding operation is being performed.

Still another problem presented by the resistance welding guns of heretofore conventional structure is the excessive wear of the piston rod. This is due to the fact that laterally directed forces are imposed on the piston and movable electrode assembly whenever the movable electrode assembly in contacting the outer part of the article to be welded is not perpendicular to the surface of the part.

Still another problem involved in the resistance welding guns of heretofore conventional structure relates to the gun yoke. The yoke in such structure is an integral part of the pressure fluid cylinder casing. Consequently, whenever it has become necessary to replace the yoke, it is also necessary to replace the cylinder casing. Hence, this structural aspect heretofore has resulted in a high maintenance and service cost.

There is a need, therefore, for a new and improved resistance welding gun structure. A general object of this invention is to supply this need.

A specific object of this invention is the provision of a resistance welding gun in which the rolling shunt is enclosed in a housing preventing dirt, flash material, and other foreign and abrasive substances from clogging the shunt laminations and resulting in failure of the shunt.

Another object of the invention is the provision of a rolling shunt which is housed in an oil or lubricant-filled enclosure which will lubricate the laminations of the shunt and serve to conduct away from the shunt heat arising from the passage of the high amperage current therethrough. An advantage arising through this improved cooling of the shunt is that the resistance thereof remains constant rather than increasing, as is the case with the prior art guns where the shunts are cooled by the ambient atmospheric air and the temperature tends to rise as the gun is in operation.

Another object of the invention is the provision of a resistance welding gun wherein the coolant hoses are remotely located relative to the welding electrodes and therefore do not interfere with such electrodes or with the welding area during operation of the gun.

Another object of the invention is the provision of a resistance welding gun wherein those portions of the gun that serve to conduct the electric current, and which may be referred to as the conducting members of the secondary circuit of the gun, are subject to coolant fluid whereby heat tending to arise as the result of the passage of electric current through such portions is readily conducted away. In carrying out this object, the rod supporting the movable electrode and which extends between such electrode and the fluid pressure cylinder for reciprocating the electrode, is water cooled. Further, those portions of the gun between and to which the rolling shunt is connected are water cooled such that heat is drawn out of the shunt through opposite ends thereof.

A further object is the provision in a resistance welding gun of two bearings for supporting the movable electrode, as distinguished from the prior art where but one bearing is employed, and with such two bearings being disposed on opposite sides of the point of connection of the rolling shunt with the rod supporting the movable electrode. A concomitant object is the provision of bearings for supporting the rod carrying the movable electrode which are so arranged in the gun assembly relative to the oil-filled shunt housing that the oil in such housing may serve to lubricate the bearings.

A still further object of the invention is the provision in a resistance welding gun of a low inertia movable electrode assembly.

Other objects, advantages, and meritorious features will more fully appear from the specification, claims, and accompanying drawings, wherein:

FIG. 2 is a plan view of the resistance welding gun of FIG. 1, which view has been taken as indicated by the sectioning planes 2—2;

FIG. 3 is a sectional view of the welding gun of FIG. 1, which view has been taken as indicated by the sectioning plane 3—3 of FIG. 1;

FIG. 4 is a front, partially sectioned, view of the central portion of the resistance gun, which view has been taken as indicated by the planes 4—4 of FIG. 1;

FIG. 5 is a longitudinal sectional view of the relatively movable electrode assembly of the gun of FIG. 1, which view has been taken as indicated by the sectioning plane 5—5 of FIG. 1;

FIG. 6 is a cross sectional view of a portion of the resistance welding gun of FIG. 1, which view has been taken as indicated by the sectioning plane 6—6 of FIG. 1; and FIG. 7 is another cross sectional view of a portion of the resistance welding gun, which view has been taken as indicated by the sectioning plane 7—7 of FIG. 1.

Figure 1:
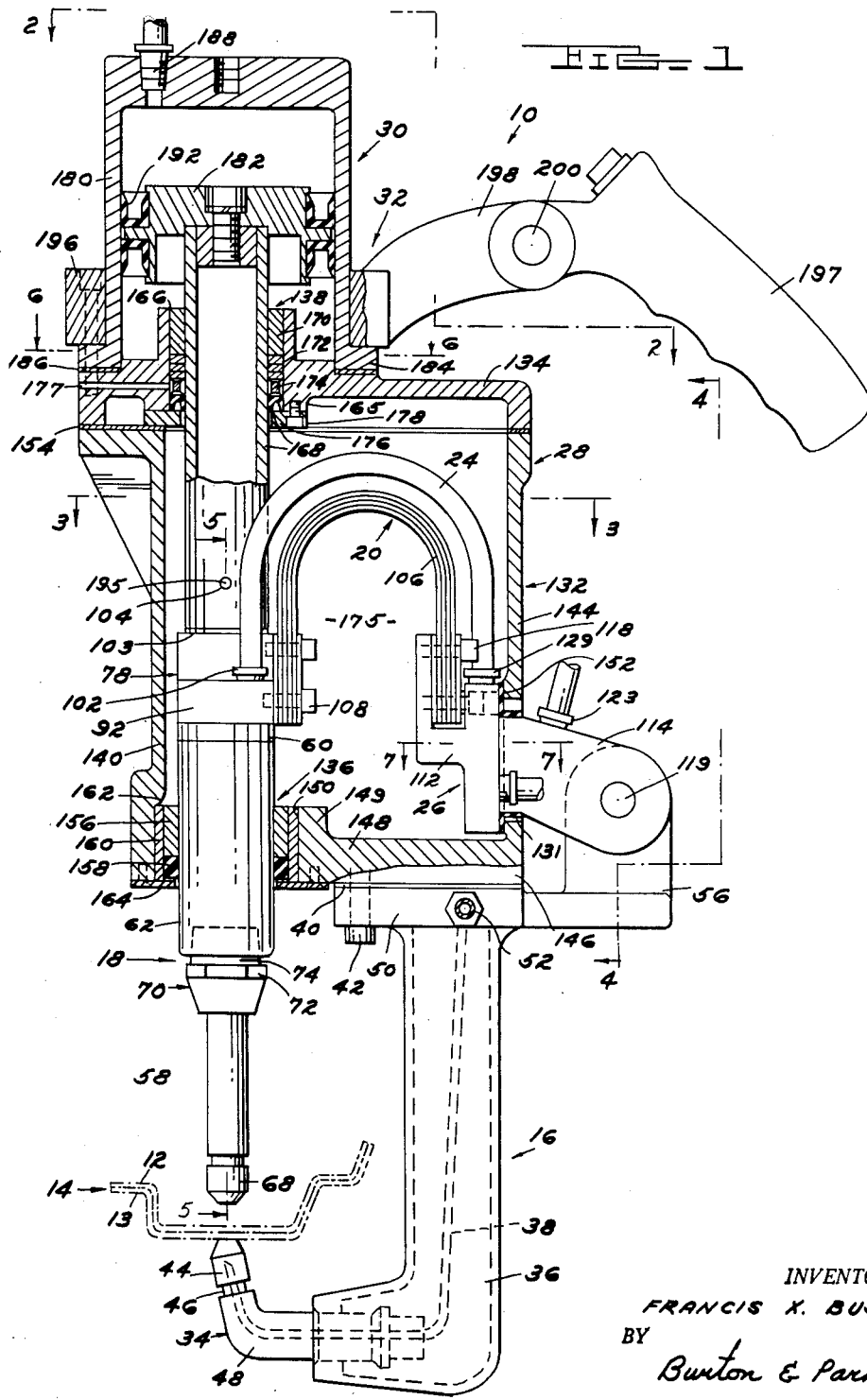
FIG. 1 is a side view of a preferred embodiment of the resistance welding gun of this invention, which view has been partially sectioned to reveal internal structure of the gun.

More particularly, the drawings disclose a portable, resistance welding gun 10. Between the electrodes of the resistance welding gun 10 are the pieces 12 and 13 of an article 14, which are to be spot-welded together by the resistance welding gun 10.

The structure of the resistance welding gun 10 comprises a first welding electrode assembly 16, a second welding electrode assembly 18, a rolling shunt assembly 20, coolant transfer hoses 22 and 24, a stationary service block 26, a shunt and hose housing 28, a pressure fluid cylinder assembly 30, and a gun handle assembly 32.

The first welding electrode assembly 16 is relatively stationary in the resistance welding gun structure. It comprises an electrode structure 34, a yoke 36, a coolant delivery tube 38, an insulating gasket 40, and mounting screws 42.

The electrode structure 34 comprises a welding electrode tip 44 having a tapered shank portion 46 received in an L-shaped hollow member 48. The electrode tip 44 is in the form of a replaceable cap taper mounted on the member 48. The inner end of the member 48 is removably rigidly mounted in any convenient fashion in the outer end of the yoke 36.

The yoke 36 functions to support, to conduct coolant from, and to conduct electric current to and from the electrode structure 34. It is generally hollow and open at both ends. Together, in side view (FIG. 1), the combination of the electrode tip 44, tube member 48, and yoke 36 resembles a J. The yoke 36 has an electrode end with a port in which the transverse tube member 38 is mounted, and a support end. The support end of the yoke member 36 has a flange 50. The flange 50 has a pair of ports, one on each side of the yoke 36, in which are normally mounted coolant hose fittings 52 and 54 (see FIGS. 1, 3, and 4). One of the ports opens into the interior of the yoke 36 and functions as the coolant discharge port. The coolant hose fitting 52 is mounted in this port. The other of the ports, the one in which the hose fitting 54 is mounted, is joined to the intake end of the coolant delivery tube 38. Integral with the flange 50 is a cable terminal 56 with a lateral bolt hole therethrough. The support end of the yoke 36 is attached to the housing 28 by means of the mounting screws 46. However, the insulating gasket 4 is disposed between the support end of the yoke 36 and the housing wall.

The coolant delivery tube 38 is disposed within the interior of the yoke 36. It extends from the coolant delivery port concentrically through the yoke 36, through the transverse tube member 48, and through the nipple member 46 to adjacent the interior surface of the electrode tip 44 whereat the coolant delivery tube 38 has an outlet opening.

The second welding electrode assembly 18 is relatively movable longitudinally in the resistance welding gun 10. It comprises an electrode 58, an electrode holder 60, a cylinder sleeve member 62, a coolant delivery tube 64, and a tube seal 66.

The electrode 58 is a hollow, cylindrical tube open at the inner end thereof and closed by a cap section 68 at the outer end thereof. The cap section 68 provides an electrode tip. The electrode 58 is longitudinally disposed whereby the cap section 68 is substantially in longitudinal alignment with, and opposite from, the electrode tip 34 of the first welding electrode assembly 16. At the inner end of the electrode 58 there is provided an annular coupling section 70. The coupling section 70 has a flange portion 72 which, in plan view, is polygonal in shape, more particularly, hexagonal, in order to accommodate a turning tool such as, for example, a wrench. From the flange portion 72 to the inner end of the electrode 58 the coupling section 70 comprises an exterior, circumferentially threaded surface portion 74.

The electrode holder 60, an integral structure of electrically conductive material, comprises a cylindrical tube section 76, a movable service block section 78, and a piston rod attachment post section 80.

The cylindrical tube section 76 has at the outer end thereof an interior, circumferentially threaded portion 82 for receiving in threaded engagement the corresponding threaded surface portion 74 of the electrode 58. The outer sleeve member 62 encircles in press fit the exterior of the cylindrical tube section 76. The cylindrical tube section 76 merges into the movable service block section 78.

The movable service block section 78 comprises a longitudinally disposed face portion 86 with screw holes 88 therethrough for connecting thereto one end of the rolling shunt assembly 20. On one side of the movable service block section 78, relative to the face portion 86, there is provided a laterally extending flange portion 90 and on the other side there is provided another laterally extending flange portion 92 (see FIG. 5). Longitudinally aligned in the flange portion 90 and on the piston side thereof is a coolant delivery port 94. Transversely disposed to the coolant delivery port 94 is an inner, coolant delivery passageway 96 which has along the center line of the electrode holder 60 a longitudinally aligned portion which extends to an inner port 97 at the inner end of the cylindrical tube section 76. Longitudinally disposed in the other laterally extending flange portion 98 and on the piston side thereof is a coolant discharge port 98. Between the coolant discharge port 98 and the interior of the cylindrical tube section 76 is a transversely disposed coolant discharge passageway 100. The inlet of the passageway is disposed between the inner port 97 and the wall of the cylindrical tube section 76. Mounted in the coolant delivery port 94 is a hose fitting 101. Mounted in the coolant discharge port 98 is another hose fitting 102.

The piston rod attachment post section 80 is longitudinally generally cylindrical. The outside diameter of the post section 80 is such that at the base thereof, whereat it merges into the movable service block section 78, the movable service block section 78 provides an annular shoulder 103. Within the region of the outer or piston rod end of the piston rod attachment post section 80 there is provided a transversely disposed pin hole 104.

The coolant delivery tube 64 is longitudinally and concentrically disposed within the tubular electrode 58 and cylindrical tube section 76 of the electrode holder 60. It has a discharge opening in the region of the interior surface of the cap section 68 of the electrode 58. At the other end of the coolant delivery tube 64 there is also provided a longitudinally disposed opening. This end of the coolant delivery tube 64 is disposed within the inner port 97 at the end of the transverse flow passageway 96 in the movable service block section 78. Between the coolant delivery tube 64 and the surrounding wall of inner port 97 there is disposed in press fit the tube seal 66.

The rolling shunt assembly 20 (see FIG. 1) comprises a stack of electrically conductive, flexible, spring-like strips or leaves 106. In position in the resistance welding gun 10, the stack of leaves 106 in side view forms a U with the bight of the U facing the first welding electrode assembly 16. A portion of the stack of leaves 106 at one end thereof is longitudinally aligned and disposed parallel to the face 86 of the movable service block section 78 and is fastened thereto as by screws 108 disposed in the screw holes 88 in the face. A portion of the stack of leaves 106 at the other end of the rolling shunt assembly 20 is longitudinally aligned, mounted in, and secured to the stationary service block 26.

The coolant transfer hoses 22 and 24 are flexible conduits from the stationary service block 26 to the movable service block section 78 of the electrode holder 60 in the second welding electrode assembly 18. In position, the coolant delivery and discharge hoses 22 and 24 in side view resemble in each case a U with the bight of the U facing the first welding electrode assembly 16, and are disposed around and outside of the bight of the U formed by the rolling shunt assembly 20. The inlet end of the coolant delivery hose 22 is attached to the hose fitting 101 mounted in the coolant delivery port 94 of the movable service block section 78. The discharge end of the coolant discharge hose 24 is connected to the hose fitting 102 mounted in coolant discharge port 98 of the movable service block section 78. The other ends of the coolant transfer hoses 22 and 24 are coupled to corresponding ports in the stationary service block 26.

The stationary service block 26 comprises a rolling shunt assembly receiving section 112 and a cable terminal section 114. Both sections are integral with one another and constructed out of electrically conductive material. In side view the shunt receiving section 112 has an appearance much like that of an h (see FIG. 1). It comprises a transverse slot 116 parallel to the face 86 of the movable service block section 78. Seated in the slot 116 is the corresponding end of the rolling shunt assembly 20. Said corresponding end of the rolling shunt assembly 20 is secured to the shunt receiving section 112 as by screws 118. The cable terminal section 114 extends forwardly from the shunt receiving section 112. The front side of the shunt receiving section 112 is normally disposed inside of the shunt and hose housing assembly 28 while the cable terminal section 114 extends from the shunt receiving section 112 to a position outside of the housing assembly 28. In the region of the front end the cable terminal section 114 comprises a transverse hole 119 therethrough for receiving a cable mounting bolt. In addition, the cable terminal section 114 in the region of the outer end thereof, between the transverse hole 119 and housing 28, comprises a longitudinally aligned port 122 for receiving a coolant delivery conduit fitting 123. Internally (see FIG. 7), the cable terminal section 114 has a flow passageway 124 interconnecting the inlet port 122 and a longitudinally aligned outlet port 126 disposed in the shunt receiving section 112. The receiving end of the coolant delivery hose 22 is connected to a hose fitting 127 mounted in the outlet port 126. Adjacent the outlet port 126 and longitudinally disposed in the shunt receiving section 112 is an intake port 128 in which is mounted a hose fitting 129. Attached to the hose fitting 129 is the discharge end of the coolant discharge hose 24. An internal passageway is provided within the shunt receiving section 112 (see FIG. 7) for interconnecting the intake port 128 to a discharge port 130 in the front side of the shunt receiving section 112. Mounted in this discharge port 130 is a coolant discharge conduit fitting 131.

The shunt and hose housing 28 comprises the combination of a housing member 132, an end closure member 134, various insulator and sealing gasket members, an outer, bearing ring structure 136 for the longitudinally movable, second welding electrode assembly 18, and an inner, bearing ring structure 138 for the piston rod of the pressure fluid assembly 30.

The housing member 132 (see FIG. 1) is a generally rectangular container having four integral side walls 140, 142, 144, and 146, and an end wall 148 integral with the side walls. Adjacent the back side wall 140 the end wall 148 has an inwardly extending embossment 149 with a longitudinally aligned hole 150 therethrough. Disposed in the hole is the outer bearing ring structure 136. In the region of the front side walls 142 of the housing member 132 the end wall 148 has exteriorly screw holes therethrough for receiving the mounting screws 46 supporting the yoke 36 of the first welding electrode assembly 16. In the region of the end wall 148 of the housing member 132 the front side wall 144 has an opening therethrough for the cable terminal section 114 of the stationary service block 26. The shunt receiving section 112, disposed on the inside of the housing 132 is positioned next to the front side wall 144, but is separated therefrom by a gasket 152 which not only functions to prevent leakage of fluid from inside the housing but also to electrically insulate the housing 132 from the stationary service block 26. Hence, the gasket 152 has a portion thereof surrounding the portion of the cable terminal section 114 adjacent the front side wall 144 and within the opening therethrough. Between the end closure member 134 and the housing 132 there is also provided a sealing gasket 154.

The outer bearing ring structure 136 encircles the outer sleeve 62 on the electrode holder 60. It comprises a bearing ring 156 and at the outer end thereof a fluid sealing ring 158. Between the bearing ring 156 and the housing 132 and between the fluid seal 158 and the housing 132 is a cylindrical insulator sleeve 160. The insulator sleeve functions to electrically isolate the longitudinally movable, second welding electrode assembly 18 from the end wall 148 of the housing 132. In this regard, it will be observed that the back side wall 140 of the housing in the region of the bearing ring 156 has an undercut portion 162 which prevents the same from coming into physical contact with the bearing ring 156. The bearing ring 156 is press fitted within the sleeve 160, which is in turn press fitted in the hole 150. The fluid seal 158 is retained by an annular plate 164 attached to the end wall 148 as by screws and the like. The plate 164 has an inside circumference underneath the fluid seal 158 with a diameter substantially greater than the outside diameter of the outer sleeve 62 so that the inside circumference is spaced therefrom by an annular gap.

The inner bearing ring structure 138 is in combination with the end closure member 134. In this regard, the end closure member 134 has an embossment 165 through which there is a longitudinally aligned hole 166. When the end closure member 134 is in position on the housing member 132 the longitudinally aligned hole 166 is coaxially aligned with the hole 150 through the end 148 of the housing 132. Disposed within the hole 166 through the end closure member 134 is the piston rod 168 of the pressure fluid cylinder assembly 30. Concentrically disposed around the piston rod 168 in longitudinal sequence from the pressure fluid cylinder assembly 30 side to the housing 28 side are a bearing ring 170, packing rings 172, a spacer ring 174, and a U-ring seal 176. Preferably the end closure member 134 has a transverse air bleed passageway 177 (see FIGS. 1 and 6) from the longitudinally aligned hole 166 in the region of the spacer ring 174 to the exterior of the gun 10 in order to prevent an air pressure build-up within the shunt chamber 175 in the shunt and hose housing 28. The inner bearing ring structure 138 is press fitted in the hole 166 and the seals 172, bleeder spacer 174, and seal 176 are retained by annular plate 178 secured to the end closure member 134 as by screws and the like. The plate 178 likewise has an inner circumferential periphery of diameter greater than the outside diameter of the piston rod 168, whereby the inner circumference of the plate 178 is spaced from the piston rod 168 by an annular gap.

The pressure fluid cylinder assembly 30 comprises a casing member 180, the end closure member 134, a piston 182, and the piston rod 168. The casing member 180 is cylindrical, open at the end thereof adjacent the end closure member 134, and closed at the opposite end. At the end of the casing member 180 adjacent the end closure member 134, however, there is a laterally extending, annular flange 184. This flange is disposed adjacent to the outer side of the end closure member 134. Between the annular flange 184 and the end closure member 134 is an annular gasket 186. At the closed end of the casing member 180 there is provided a pressure fluid port 188 for delivering and discharging pressure fluid to and from the interior of the casing member 180. Within the area defined by the interior of the casing member 180 (see FIG. 6), the end closure member 134 has an opening and an inner passageway in communication with a lateral pressure fluid discharge and delivery port 190. The pressure fluid discharge ports 180 and 190 have mounted therein pressure fluid fittings for receiving pressure fluid conduits from a source of pressure fluid actuated by the operator of the resistance welding gun 10. Within the casing member 180 is the piston 182. It is longitudinally movable from one end of the casing member 180 to the other. The piston 182 is preferably provided at the outside circumference thereof with annular sealing and insulator rings 192, such as those of the U-shaped type, which space the piston from the side wall of the casing 180 and prevent physical contact therebetween.

The piston rod 168 is generally hollow. At the outer end thereof it encircles the central post section 80 of the electrode holder 60 with said end adjacent the annular shoulder 103 (see FIG. 5). Between the end and interior surfaces of the piston rod 168 at the outer end thereof and the piston rod attachment post section 80 and shoulder 102 is an insulator sleeve 193 with a lateral, annular flange 194. The piston rod 168 is attached to the center post section 80 of the electrode holder 60 by means of a pin 195 transversely disposed in press fit through holes in the piston rod 168 and through the pin hole 104 in the piston rod attachment post section 80. Preferably, the pin 195 is of an electrically non-conductive material, but if it be of an electrically conductive material it is surrounded by an insulator sleeve.

The gun handle assembly 32 (see FIGS. 1 and 2) comprises a ring portion 196, a hand grip portion 197, and a connecting portion 198. The ring portion 196 of the gun handle assembly 32 surrounds the casing member 180 adjacent the annular flange 184 thereof. The ring portion 194 is secured thereto and to the end closure member 134 of the housing assembly 28 as by screws and the like. The connecting portion 198 is disposed transversely to the ring portion 194 and merges thereinto. It may comprise a transverse hole 200 therethrough for receiving a mounting bolt for attaching the resistance welding gun 10 to a counterbalancing support. The hand grip portion 197 merges into the connecting portion 198. It is generally longitudinally aligned to enable the operator of the resistance welding gun 10 to guide the same into position and to hold the same in position while an article 14 is being spot welded. Although not shown in the embodiment illustrated in the drawings, a trigger mechanism may be provided in the hand grip portion 196 for actuating the pressure fluid system associated with the pressure fluid cylinder assembly 30. In the embodiment shown, however, a foot pedal arrangement and the like, remote from the resistance welding gun 10, is employed to actuate the pressure fluid system.

In the normal, static position of the piston 182 in the casing member 180 and thus of the electrode 58, relative to the electrode tip 34 of the first welding electrode assembly 16, the electrode tip presented by the electrode 58 is spaced apart from the electrode tip 34 of the first electrode assembly 16. Hence, the piston rod 168 is in retracted position. Under operative conditions, to make a weld, the piston rod 168 is extended until the article 14 between the electrode tips prevents further extension thereof. In fully extended position the piston 182 is adjacent to, but out of physical contact with, the end closure member 134.

In assembling the resistance welding gun 10, the housing assembly 28 is filled with an electrically inert, fluid lubricant. This immerses the rolling shunt assembly 20 as well as the coolant delivery hose 22 and coolant discharge hose 24. It will also immerse the shunt receiving member 112 of the stationary service block 26 as well as the movable service block section 78 and portions of the outer sleeve 62 and piston rod 168 within the interior of the housing assembly 28.

To prepare the resistance welding gun 10 for operation, the electrical current conducting cables for the gun are bolted to the cable terminals 56 and 114. The fittings 52, 54, 123 and 131 of the coolant delivery and discharge conduits are mounted in the corresponding coolant delivery and discharge ports of the gun. Circulation of coolant through the welding electrode assemblies 16 and 18 is commenced and electrical potential applied to the electrical current conducting cables bolted to the cable terminals. Because the various gaskets and sealing rings function as insulators, the first welding electrode assembly 16 is electrically remote from the second welding electrode assembly 18 and internally no electrical shorts exist.

To operate the resistance welding gun 10, it is brought into position relative to an article 14 to be welded with the article 14 being disposed between the electrode tip 34 of the first welding electrode assembly 16 and the tip of the electrode 68 of the second electrode assembly 18. Preferably, the electrode tip 34 of the relatively stationary first welding electrode assembly 16 is brought to bear against the article 14 at the position which it is desired to have a spot weld. The operator of the resistance welding gun 10 thereupon depresses the foot lever (or trigger, as the case may be), causing pressure fluid to enter through the port 188 into the interior of the casing 180 and causing pressure fluid to discharge from the interior of the casing 180 on the other side of the piston member 182 through the port 190. This forces the piston 182 to move towards the end closure member 134 and thereby causes the piston rod 168 to be extended from the pressure fluid cylinder assembly 30. This in turn causes the longitudinally movable, second welding electrode assembly 18 to move longitudinally towards the electrode tip 34 of the relatively stationary first welding electrode assembly 16. The tip of the electrode 58 contacts the article 14 and presses against the same to clamp the workpiece between the opposing electrode tips. This establishes a path for electrical welding current which is thereafter applied and a massive quantity thereof moves between the electrode tip 34 and the tip of the electrode 58 through the article 14. Adjacent metallic surfaces between the parts 12 and 13 of the article 14 fuse together in a spot generally defined by the area of the electrode tip 34 and tip of the electrode 58. After the welding operation, the direction of pressure fluid flow in the pressure fluid cylinder assembly 30 is reversed. Pressure fluid is introduced through the port 190 into the cylinder and out of the port 188. As a result, the piston 182 moves away from the end closure member 134, retracting the piston rod 168 and pulling the tip of the electrode 58 away from the article 14.

A major feature of advantage of this invention is the durability of the rolling shunt assembly 20. Under test conditions, a rolling shunt assembly in an experimental resistance welding gun of structure corresponding to that of the resistance welding gun 10 shown in the drawings, was found to have a service life at least three times as long as the rolling shunt assemblies in guns of heretofore conventional structure.

Another major feature of advantage of the welding gun structure of this invention is that the yoke 36 is separable from the gun housing 132. It can now be replaced without having to replace the housing 132 and pressure fluid cylinder casing 180.

Another feature of advantage of the welding gun structure of this invention is the location of the coolant intake and discharge ports 122 and 130 of the gun. Such location is relatively remote from the welding region of the gun and from the movable electrode assembly 18. Moreover, hoses to the relatively movable, welding electrode assembly are disposed within the housing and away from the welding area.

Still another feature of advantage of the welding gun structure of this invention resides in the two longitudinally spaced-apart bearing rings 156 and 170. By having these rings in association with the longitudinally movable, welding electrode assembly 18, the electrode 58, electrode holder 60, piston rod 168, and piston 182 are established and maintained in longitudinal alignment regardless of the laterally or transversely directed forces imposed thereon because of the structure and position of the article 14 being welded. Thus, wear in the longitudinally movable, welding electrode assembly 18 and pressure fluid cylinder assembly 30 is minimized.

These and other features, advantages, and embodiments will be apaprent to those in the exercise of ordinary skill in the art upon reading the foregoing specification. Hence, it should be understood that the specific embodiment just described has been disclosed for purposes of illustration and not of restriction and that the scope of the invention is measured by the claims appended hereto and not by the description preceding them. Moreover, all embodiments and modifications and variations thereof within the metes and bounds of a claim are intended to be embraced by that claim unless expressly excluded by language therein.

What I claim is:

1. In a resistance welding gun: a movable electrode cooperable with a fixed electrode to clamp therebetween articles to be welded, a closed housing, a rolling shunt enclosed within the housing having one end electrically connected to and movable with the movable electrode and the other end connected to a fixed cable terminal, a heat conducting, electrically non-conductive liquid lubricant in the housing bathing the shunt, and a supporting bearing encircling the movable electrode and exposed to said lubricant in the housing to prevent lateral play of the movable electrode.

2. In a resistance welding gun: a movable electrode cooperable with a fixed electrode to clamp therebetween articles to be welded, a closed housing, movable electrode supporting means extending into the closed housing and movable relative thereto, a fixed cable terminal exteriorly of the housing and having an electrically conductive portion extending within the housing, a rolling shunt enclosed within the housing and having one end connected to said means to move therewith and the other end connected to said electrically conductive portion of the terminal, a heat conducting, electrically non-conductive liquid lubricant in the housing bathing the shunt, and a pair of supporting bearings encircling said means at opposite sides of the connection of the shunt and means, to prevent lateral play of said means.

3. In a resistance welding gun: a movable electrode cooperable with a fixed electrode to clamp therebetween articles to be welded, a closed housing, a reciprocable electrode supporting rod disposed in the housing and extending outwardly therefrom and upon which the movable electrode is extended in opposition to the fixed electrode, an actuator connected to said rod to shift the movable electrode relative to the fixed electrode, a cable terminal mounted on said housing and having an electrically conductive portion extending into the housing, a rolling shunt enclosed within the housing with one end connected to said rod and the other end to said portion of the terminal, and a heat-conducting, electrically non-conductive liquid lubricant in the housing bathing the shunt.

4. The invention as defined in claim 3 characterized in that a pair of rod bearings are provided encircling the rod at opposite sides of the point of connection of the shunt and rod and secured to the housing and exposed to lubricant therein to prevent lateral play of the rod.

5. The invention as defined in claim 3 characterized in that said rod is provided with an internal coolant passageway extending from the movable electrode to at least the point of connection of the rod with the rolling shunt, a flexible coolant conduit disposed in the housing and connected at one end to said passageway in the rod to move with the rod and connected at the opposite end to a fixed coolant line coupling on the housing remote from said electrodes.

6. In a resistance welding gun: a movable electrode and a cooperating fixed electrode operable to clamp therebetween articles to be welded, a gun body including a yoke portion upon which the fixed electrode is mounted, a rod reciprocably supported by said body and including an electrically conductive end portion upon which the movable electrode is mounted for movement toward and away from the fixed electrode, a rolling shunt, a cable terminal mounted on said body and having an electrically conductive portion connected to one end of said shunt, the opposite end of said shunt connected to said portion of the rod, each of said portions provided with an internal coolant conducting passageway, a connector remote from said electrodes and mounted on said cable terminal and communicating with the internal passageway of said cable terminal portion for coupling with a source of coolant fluid, a flexible conduit connected between said portions and communicating with the internal passageways thereof.

7. The invention as defined in claim 6 characterized in that said movable electrode is provided with an internal coolant fluid-conducting passageway communicating with the internal passageway in said rod portion.

8. In a resistance welding gun: a fixed electrode, a movable electrode, a reciprocable rod carrying the movable electrode, a first cable terminal, a rolling shunt connected between said terminal and said rod, a yoke carrying the fixed electrode and provided with a second cable terminal, said yoke and fixed electrode having interconnecting internal coolant conducting passageways opening outwardly of the yoke adjacent said second terminal for connection to a source of coolant fluid, said movable electrode and rod provided with interconnecting internal coolant conducting passageways opening outwardly through the rod adjacent its connection with the shunt, said first terminal provided with internal coolant conducting passageways opening outwardly at one end for connection with a source of coolant, and flexible conduit means connected to and extending between the passageways in said first terminal and rolling with the shunt.

9. In a resistance welding gun: a gun body, a fixed electrode carried by the body, a rod mounted on said body for axial movement toward and away from the fixed electrode, a movable electrode mounted on one end of said rod and confronting the fixed electrode, a fixed cable terminal on the gun body, a rolling shunt connected between said terminal and the rod, a fluid pressure actuator connected to the rod at the opposite end thereof from the movable electrode, and a pair of rod-supporting bearings mounted on said body and encircling the rod at opposite sides of the connection of the shunt and rod to prevent lateral play of the rod during clamping of articles to be welded between the electrodes.

10. In a resistance welding gun: a movable electrode cooperable with a fixed electrode to clamp therebetween articles to be welded, a movable electrode supporting rod upon which the movable electrode is extended in opposition to the fixed electrode, an actuator coupled with the rod to shift the movable electrode, a rolling shunt connected at one end to the rod and at the other end to a fixed terminal, and a pair of rod-supporting bearings encircling the rod at opposite sides of the connection of the shunt and rod to prevent lateral play of the rod during clamping of articles to be welded between the electrodes.

References Cited in the file of this patent
UNITED STATES PATENTS

| | | |
|---|---|---|
| 2,297,473 | Heim | Sept. 29, 1942 |
| 2,839,664 | Fagge | June 17, 1958 |